Patented July 15, 1924.

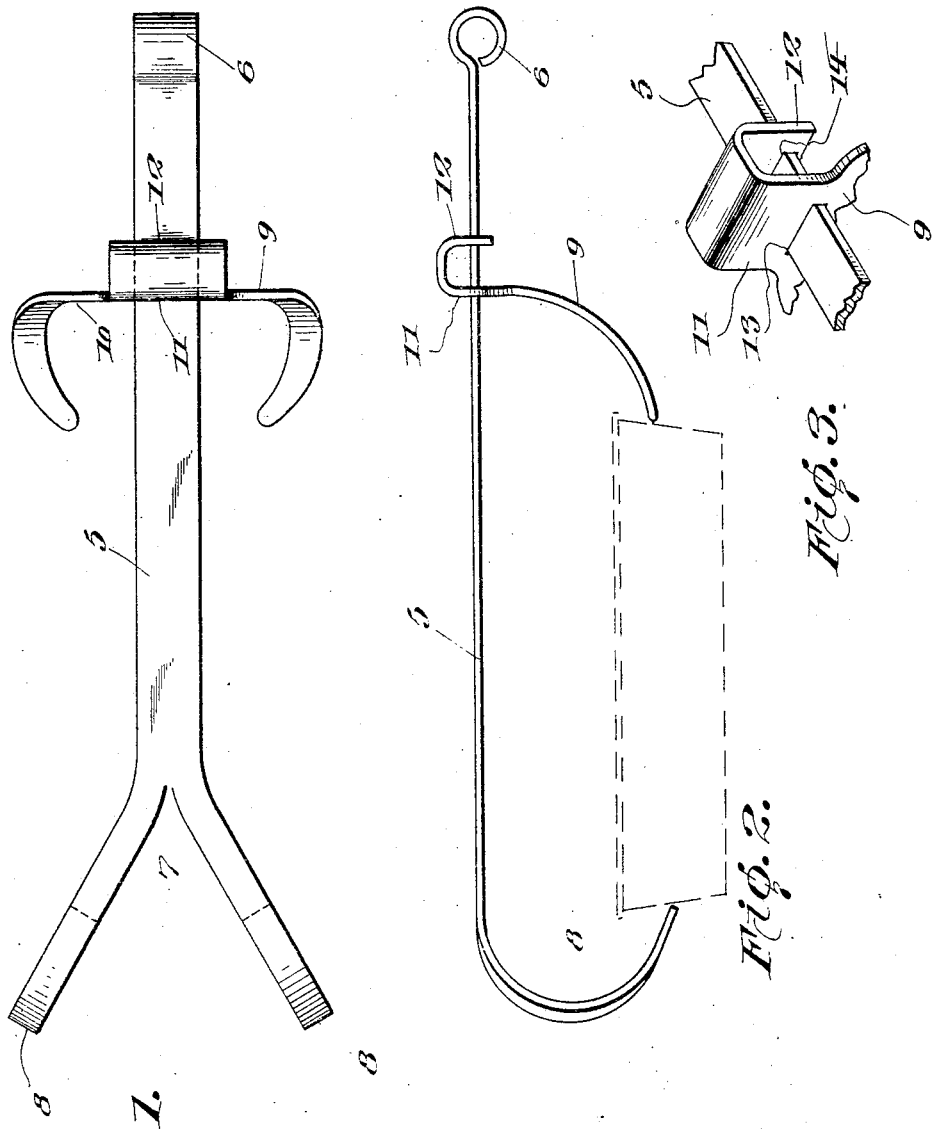

1,501,741

UNITED STATES PATENT OFFICE.

ROBERT M. BIGGS, OF WAKEFIELD, MASSACHUSETTS.

KITCHEN UTENSIL.

Application filed December 14, 1922. Serial No. 606,957.

*To all whom it may concern:*

Be it known that I, ROBERT M. BIGGS, a citizen of the United States, residing at Wakefield, in the county of Middlesex and State of Massachusetts, have invented new and useful Improvements in Kitchen Utensils, of which the following is a specification.

This invention relates to new and useful improvements in kitchen utensils and more particularly to the provision of a utensil for handling pots, pans, dishes and the like.

The invention has for its primary object the provision of a utensil of the kind stated having a novel and improved locking means for maintaining the movable member in a predetermined position, such locking means being an integral and co-acting part of said movable member.

A further object of the invention is to provide a utensil of this character which is very simple in construction, inexpensive to manufacture and convenient in use.

With the foregoing and other objects in view, the invention consists in the details of construction, and in the arrangement and combination of parts to be hereinafter more fully set forth and claimed.

In describing the invention in detail, reference will be had to the accompanying drawings forming a part of this specification wherein like characters denote corresponding parts in the several views, and in which—

Figure 1 is a plan view of the device;

Fig. 2 is a side elevation of the same; and

Fig. 3 is a detail perspective view illustrating the sliding connection between the fixed and movable members.

Referring now specifically to the accompanying drawing, the numeral 5 denotes the shank of the device which is the subject matter of this application for patent. The said shank 5 is rolled over at one end to form a loop 6 serving as a means for hanging the device itself at any convenient location in close proximity to the stove or similar apparatus. The other end of said shank 5 is bifurcated as shown at 7 (Fig. 1), the bifurcation extending downwardly and inwardly, and assuming a general claw-like appearance as generally indicated at 8.

Mounted on the shank 5, and in slidable relation thereto, is a movable member 9, which is bifurcated as shown at 10, said bifurcated part extending downwardly and inwardly to form a claw-like member, similar to the bifurcation indicated at 8, but positioned in opposed relation thereto.

The two claw-like members 8 and 9 serve the purpose of gripping a hot plate or pan to remove it from the stove hereinbefore referred to. For purposes of better indication as to this particular operation of the device with reference to its removal and placing of cooking utensils, attention is directed to Fig. 2, wherein a cooking utensil is shown in dotted lines.

It will, of course, be understood that the general form, shape, or configuration of the said cooking utensils is immaterial to the successful operation of the device, since I have designed my invention so that its gripping possibilities will be attained even on a multiplicity of shapes, forms, etc., of the various utensils used in the course of culinary operations.

Returning now to the detailed description, it will be noted that the upper portion of the movable member 9 is adapted to form the supporting means of said member.

This construction, which will now be described, comprises an upstanding portion which is curved over at its highest point to form a substantially inverted U-shaped member, having legs 11 and 12 which are transversely slotted as shown at 13 and 14 respectively, to receive the shank 5. On reference to Fig. 3 this construction will be readily understood.

In the operation of the device the movable member 9 is slid back on the shank 5 opening the space between the members 8 and 9 the desired distance. The member 8 is then placed against the side of the vessel while the movable member 9 is advanced by hand until it comes in contact with the vessel. The vessel may now be lifted.

It will be observed that no additional locking means is provided for holding the movable member sufficiently advanced against the vessel without danger of the former sliding backwardly and releasing its load. By providing the two slots in the legs of the movable member, two points of sliding contact are secured and also two points for gripping or binding action between the shank 5 and the movable member 9. The latter advantage is of great value in preventing any slippage and as it is customary to depend on a single slot in the slidable member of similar devices, it is at once apparent that a distinct advantage is thereby secured by the adoption of such a two-point contact and gripping method. Obviously the greater the weight of an article to be lifted, the greater the binding and gripping reaction of the device.

While the preferred embodiment of the invention has been illustrated and described, it will be understood that various slight changes may be made therein within the spirit and scope of the invention as defined by the following claim.

I claim:

A cooking receptacle supporting device comprising shank, and a movable member having its rear portion formed with a U-shaped attaching portion having spaced substantially parallel legs provided with slots receiving said shank, the lower portion of said movable member and the forward portion of said shank being divided and curved longitudinally in opposite direction to provide pairs of utensil engaging arms, the terminal portions of said utensil engaging arms being adapted for contact with opposite sides of a cooking utensil and the remaining portion of said arms being curved away and upwardly from the cooking utensil to space the major portion of the shank a substantial distance above the cooking utensil whereby the shank may be manually engaged at a point between said arms.

In testimony whereof I affix my signature.

ROBERT M. BIGGS.